May 28, 1929.  O. BROCKMAN  1,714,943

PROCESS FOR ATTACHING COMPOSITION SOLES

Filed March 8, 1926

Inventor
Oscar Brockman
By Mason Fenwick & Lawrence,
Attorneys

Patented May 28, 1929.

1,714,943

UNITED STATES PATENT OFFICE.

OSCAR BROCKMAN, OF LOUISVILLE, KENTUCKY.

PROCESS FOR ATTACHING COMPOSITION SOLES.

Application filed March 8, 1926. Serial No. 93,304.

This invention relates to a process for attaching rubber soles to leather shoes.

An object of this invention is to provide an easy and quick method whereby rubber soles may be attached to leather or other kinds of soles without the use of stitching or nails.

Another object is to so prepare the rubber sole that in order for the purchaser to use the same he need only remove an outer covering in order to apply the same to the leather sole.

Other objects and advantages will hereinafter appear.

The invention is illustrated in the accompanying drawings, in which.

Figure 1:
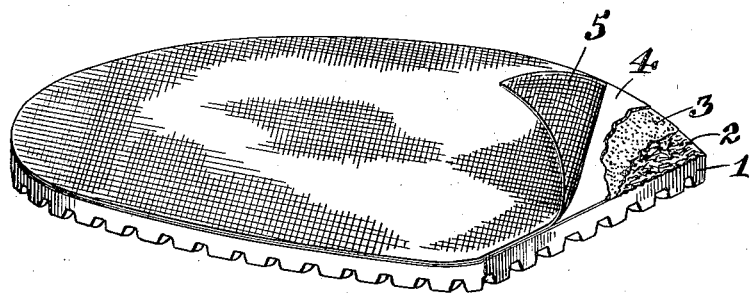
Figure 1 is a top plan of the sole with a fragmentary section removed exposing the construction of the sole.
Figure 2:
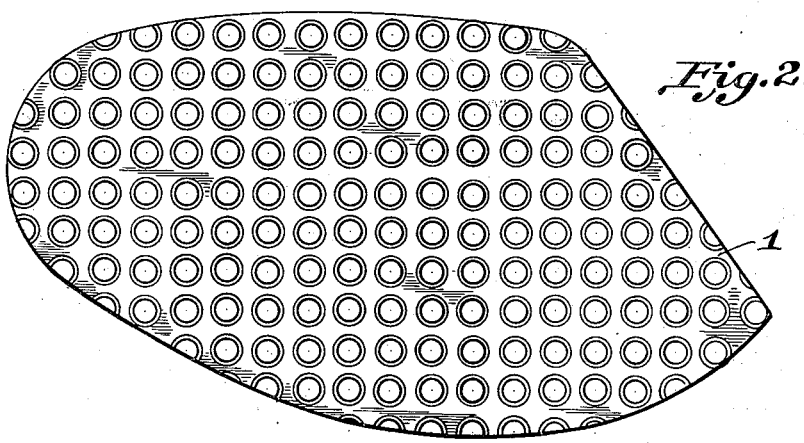
Figure 2 is a bottom plan of the sole.
Figure 3:
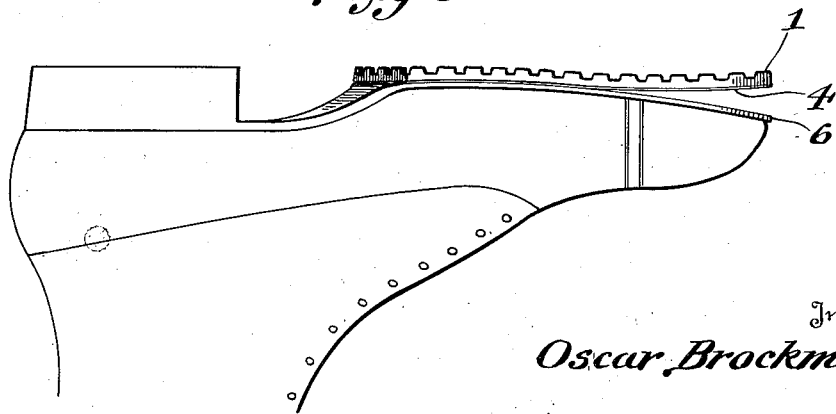
Figure 3 is a perspective of a shoe with the rubber sole partly attached.

The sole as shown in Figure 1 comprises a rubber or composition sole 1 with its top surface 2 roughened and applied to this surface a coating of rubber cement 3 which in turn is covered with a thin layer of new unvulcanized rubber gum 4. Over the whole is placed an air proof material 5 which prevents the attaching substance from losing its effectiveness by contact with air. Figure 2 merely shows the bottom of sole 1. Figure 3 shows the sole 1 partly attached to the leather sole 6.

In operation the material 5 is removed and the exposed surface 4 applied firmly to the leather sole 6. The action of the rubber cement and new unvulcanized rubber gum when exposed to the air causes the rubber sole to adhere to the leather sole 6, so firmly that the sole will not come off when the shoe is worn.

Having specifically described the invention the following claim is herewith appended, the reservation being made, however, that the invention is susceptible of many modifications and adaptations within the scope of said claim.

What I claim is:—

The process of securing a composition sole to a leather sole which consists in completely roughening one surface of the composition sole, coating said roughened face with rubber cement, applying a layer of unvulcanized rubber free from vulcanizing material to the coating of cement, and pressing the resultant compound layer sole into adhesive contact with the leather sole and with the unvulcanized rubber layer, still free from vulcanizing material, directly applied to said leather sole.

In testimony whereof I affix my signature.

OSCAR BROCKMAN.